US010533536B2

(12) United States Patent
Lee et al.

(10) Patent No.: US 10,533,536 B2
(45) Date of Patent: Jan. 14, 2020

(54) WIND POWER GENERATING DEVICE INSTALLED IN A VEHICLE

(71) Applicants: Shou-Hsun Lee, Tainan (TW); Chun-I Li, Tainan (TW)

(72) Inventors: Shou-Hsun Lee, Tainan (TW); Chun-I Li, Tainan (TW)

(73) Assignee: Shou-Hsun Lee, Tainan (TW)

( * ) Notice: Subject to any disclaimer, the term of this patent is extended or adjusted under 35 U.S.C. 154(b) by 18 days.

(21) Appl. No.: 15/981,185

(22) Filed: May 16, 2018

(65) Prior Publication Data

US 2018/0335021 A1 Nov. 22, 2018

(30) Foreign Application Priority Data

May 22, 2017 (TW) ............................ 106116800 A

(51) Int. Cl.
  *F03D 9/32* (2016.01)
  *F03D 9/25* (2016.01)
  *F03D 9/12* (2016.01)
  *F03D 1/06* (2006.01)

(52) U.S. Cl.
  CPC ............ *F03D 9/32* (2016.05); *F03D 1/0633* (2013.01); *F03D 9/12* (2016.05); *F03D 9/25* (2016.05); *F05B 2240/941* (2013.01)

(58) Field of Classification Search
  USPC .............................. 290/44, 52, 55; 310/90.5
  See application file for complete search history.

(56) References Cited

U.S. PATENT DOCUMENTS 3,243,238 A * 3/1966 Lyman ................ F16C 32/0408
                                              310/90.5
3,598,456 A * 8/1971 Love ..................... F16C 39/063
                                              310/90.5
3,782,853 A * 1/1974 Frister ................... F04D 29/287
                                              416/132 R (Continued)

FOREIGN PATENT DOCUMENTS

AU   2018203432 A1   12/2018
AU   2018203432 B2   3/2019

(Continued)

OTHER PUBLICATIONS

European Search Report in Application No. EP20180172662, filed May 16, 2018, dated Oct. 23, 2018.

(Continued)

*Primary Examiner* — Pedro J Cuevas
(74) *Attorney, Agent, or Firm* — Heslin Rothenberg Farley & Mesiti P.C.; George Blasiak

(57) ABSTRACT

A wind power generating device includes: a fan blade; a rotating device, which is kinetically connected to the fan blade so as to rotate with the fan blade; a securing ring being configured to surround the rotating device; and a power generating device with a power input shaft kinetically connected to the rotating device. By a kinetic assisting device formed by the rotating device and the securing ring, the wind power generating device is capable of maintaining a time period of electricity generation even when wind speed is low or none due to vehicle stop, and further enhances the practical requirement of wind power generating device as being installed in a vehicle.

9 Claims, 4 Drawing Sheets

(56) References Cited

U.S. PATENT DOCUMENTS

| | | | | |
|---|---|---|---|---|
| 4,040,681 A * | 8/1977 | van der Heide | ........ | B60L 13/04 310/90.5 |
| 4,314,160 A | 2/1982 | Boodman | | |
| 4,320,927 A * | 3/1982 | Sertich | ...................... | A61C 1/05 310/90.5 |
| 4,340,260 A * | 7/1982 | Forster | ................ | F16C 32/0429 310/90.5 |
| 4,356,772 A * | 11/1982 | van der Heide | ........ | B60L 13/04 104/282 |
| 4,379,598 A * | 4/1983 | Goldowsky | ......... | F16C 32/0429 310/90.5 |
| 4,926,107 A * | 5/1990 | Pinson | ...................... | H02J 3/30 310/74 |
| 4,995,282 A * | 2/1991 | Schumacher | ........... | F16F 15/31 318/466 |
| 5,086,664 A * | 2/1992 | Wagner | ................... | F16H 33/02 475/111 |
| 5,481,146 A * | 1/1996 | Davey | ................... | B60L 13/04 310/154.05 |
| 6,570,286 B1 * | 5/2003 | Gabrys | ................ | F16C 32/0414 310/90.5 |
| 6,731,038 B2 * | 5/2004 | Kuipers | ................. | F16C 39/063 310/40 R |
| 6,781,270 B2 * | 8/2004 | Long | ...................... | A63H 33/26 310/152 |
| 6,831,374 B2 * | 12/2004 | Seki | ........... | F03D 7/06 290/44 |
| 6,836,042 B2 * | 12/2004 | Kuipers | ................. | F16C 39/063 310/40 R |
| 6,948,910 B2 * | 9/2005 | Polacsek | ................ | F03D 1/0608 416/1 |
| 7,147,069 B2 * | 12/2006 | Maberry | .................. | B60K 6/48 180/2.2 |
| 7,417,334 B2 * | 8/2008 | Uchiyama | ................ | H02K 7/14 290/55 |
| 7,462,950 B2 * | 12/2008 | Hu | ........................ | F16C 39/066 290/44 |
| 7,633,177 B2 * | 12/2009 | Platt | ........................ | F03D 13/20 290/54 |
| 7,821,168 B2 * | 10/2010 | Halstead | .................. | H02K 7/09 310/103 |
| 8,100,651 B2 * | 1/2012 | Tsou | ........................ | F03D 3/005 416/55 |
| 8,257,018 B2 * | 9/2012 | Coffey | .................... | F03D 3/005 415/4.2 |
| 8,338,976 B2 * | 12/2012 | Kazadi | .................. | H02N 15/00 290/44 |
| 8,436,485 B1 * | 5/2013 | Smith | ........................ | F03D 9/11 290/55 |
| 8,513,826 B2 * | 8/2013 | Mazur | ................. | F16C 39/066 290/44 |
| 8,534,987 B2 * | 9/2013 | Coffey | .................... | F03D 3/005 415/4.2 |
| 8,933,578 B2 * | 1/2015 | Choi | .................... | F03D 7/0296 290/55 |
| 9,097,135 B2 * | 8/2015 | Van Der Ham | .......... | F01D 1/04 |
| 9,103,226 B2 * | 8/2015 | Van Der Ham | ........ | F16C 35/00 |
| 9,109,460 B2 * | 8/2015 | Bartl | ........................ | F01D 1/04 |
| 9,133,821 B2 * | 9/2015 | Mazur | ................... | F03D 80/70 |
| 9,331,603 B2 | 5/2016 | McCowen | | |
| 9,359,991 B2 * | 6/2016 | Davey | ................... | F03B 13/264 |
| 9,453,495 B2 * | 9/2016 | Coffey | .................... | F03D 3/005 |
| 9,470,210 B2 * | 10/2016 | Choi | .................... | F03D 7/0296 |
| 9,605,652 B2 * | 3/2017 | Mazur | ................... | F03D 80/70 |
| 9,856,853 B2 * | 1/2018 | French | ...................... | F03D 9/00 |
| 9,856,858 B2 * | 1/2018 | Mazur | ................. | F16C 39/066 |
| 9,998,046 B2 * | 6/2018 | Perriere | ................ | F03D 7/0244 |
| 10,060,473 B2 * | 8/2018 | Davey | ................... | F03B 13/264 |
| 10,253,755 B2 * | 4/2019 | Coffey | .................... | F03D 3/005 |
| 2003/0042812 A1 * | 3/2003 | Post | .................... | F16C 32/0412 310/90.5 |
| 2005/0169742 A1 * | 8/2005 | Kane | ...................... | F03D 3/061 415/4.4 |
| 2006/0214525 A1 * | 9/2006 | Jansen | ................ | F16C 32/0493 310/90.5 |
| 2007/0205854 A1 * | 9/2007 | Kazadi | ................. | F16C 32/0429 335/306 |
| 2008/0122308 A1 * | 5/2008 | Mleux | .................... | H02K 7/025 310/90.5 |
| 2008/0174119 A1 * | 7/2008 | Hu | ........................ | F16C 39/066 290/55 |
| 2009/0200883 A1 * | 8/2009 | Halstead | .................. | H02K 7/09 310/90.5 |
| 2009/0317251 A1 * | 12/2009 | Tsou | ........................ | F03D 3/005 416/51 |
| 2009/0324383 A1 * | 12/2009 | Mazur | .................... | F03D 80/70 415/4.2 |
| 2010/0034636 A1 * | 2/2010 | Tsou | ........................ | F03D 7/06 415/4.2 |
| 2010/0133838 A1 * | 6/2010 | Borgen | ...................... | F03D 1/06 290/52 |
| 2010/0295316 A1 * | 11/2010 | Grassman | ............... | F03D 3/005 290/55 |
| 2011/0012361 A1 * | 1/2011 | Lee | ........................ | B60K 7/00 290/55 |
| 2011/0176919 A1 * | 7/2011 | Coffey | .................... | F03D 3/005 416/124 |
| 2012/0076656 A1 * | 3/2012 | Abass | ...................... | F03B 3/121 416/176 |
| 2012/0107116 A1 * | 5/2012 | Obrecht | ................ | F03D 7/0296 416/1 |
| 2012/0175885 A1 | 7/2012 | Peer | | |
| 2013/0051978 A1 * | 2/2013 | Coffey | .................... | F03D 3/005 415/4.2 |
| 2013/0302145 A1 * | 11/2013 | Hassenflu | ............... | F03D 3/061 415/125 |
| 2014/0079535 A1 * | 3/2014 | Coffey | .................... | F03D 3/005 415/4.2 |
| 2014/0103657 A1 * | 4/2014 | Perriere | ................ | F03D 7/0244 290/44 |
| 2014/0271167 A1 * | 9/2014 | French | ...................... | F03D 9/00 415/206 |
| 2014/0333070 A1 * | 11/2014 | Van Der Ham | .......... | F01D 1/04 290/52 |
| 2014/0348638 A1 * | 11/2014 | Bartl | ........................ | F01D 1/04 415/116 |
| 2014/0353971 A1 * | 12/2014 | Davey | ................... | F03B 11/06 290/52 |
| 2014/0367970 A1 * | 12/2014 | Van Der Ham | ........ | F16C 35/00 290/52 |
| 2016/0195066 A1 | 7/2016 | Hu | | |
| 2016/0290316 A1 * | 10/2016 | Morbiato | .................. | F03D 7/06 |
| 2017/0009737 A1 * | 1/2017 | Coffey | .................... | F03D 3/005 |
| 2017/0009741 A1 | 1/2017 | Lee | | |
| 2017/0297422 A1 * | 10/2017 | Hombsch | ............... | B60K 6/105 |
| 2019/0093631 A1 * | 3/2019 | Lee | ........................ | F03D 7/0248 |

FOREIGN PATENT DOCUMENTS

| | | |
|---|---|---|
| BR | BRPI1810349 A2 | 3/2019 |
| CA | 3005233 A1 | 11/2018 |
| CN | 1381679 A | 11/2002 |
| CN | 1807881 A | 7/2006 |
| CN | 101832224 A | 9/2010 |
| CN | 201714584 U | 1/2011 |
| CN | 102292901 A | 12/2011 |
| CN | 102297073 A | 12/2011 |
| CN | 22531650 U | 11/2012 |
| CN | 104653405 A | 5/2015 |
| CN | 108930634 A | 12/2018 |
| DE | 10120623 B4 | 11/2009 |
| EP | 3406895 A1 | 11/2018 |
| IN | 201834018826 A | 3/2019 |
| JP | 2018197546 A | 12/2018 |
| JP | 6550503 B2 | 7/2019 |
| RU | 2572282 C2 | 1/2016 |
| SU | 19927 A1 | 3/1931 |
| TW | 201215336 | 4/2012 |

(56) References Cited

FOREIGN PATENT DOCUMENTS

| TW | M470805 | 1/2014 |
|---|---|---|
| TW | M473986 | 3/2014 |
| TW | 201505908 | 2/2015 |
| TW | 201901029 A | 1/2019 |
| UA | 61262 U | 7/2011 |
| WO | WO2012/115305 | 8/2012 |
| WO | WO2015190699 A1 | 12/2015 |

OTHER PUBLICATIONS

First Office Action in Application No. CN201810489028, filed May 21, 2018, dated Sep. 9, 2019. (Cited with a copy of the original document and a full text translation).
First Office Action in Application No. CA20183005233, filed May 18, 2018, dated Mar. 26, 2019.
Search Report in Application No. TW106116800, filed May 22, 2017, dated May 10, 2018. (Cited with a copy of the original document and a full text translation).
Status Report for Application No. RU2018118347 with Examination Report dated Mar. 21, 2019, filed May 18, 2018, generated Nov. 19, 2019. (Cited with a copy of the original Status Report and a full text translation of the Status Report).
Global Dossier Report for U.S. Appl. No. 15/981,185, filed May 16, 2018, generated Nov. 18, 2019.

* cited by examiner

WIND POWER GENERATING DEVICE INSTALLED IN A VEHICLE

CROSS-REFERENCE TO RELATED APPLICATION

This application claims priority to Taiwanese Patent Application No. 106116800 filed on May 22, 2017, which is incorporated by reference herein in its entirety.

FIELD OF THE INVENTION

The present invention relates to a vehicle, and more particularly relates to a wind power generating device installed in a vehicle.

BACKGROUND OF THE INVENTION

For the demand of electricity, some vehicles are equipped with conventional power generating devices, such as solar panels or wind power generating devices thereon. The solar panels on the vehicles are unable to generate electricity during cloudy or rainy days. Similarly, when a vehicle equipped with the conventional wind power generating device is stopped, a fan blade of the wind power generating device is stopped accordingly and unable to generate electricity due to the lack of wind force.

However, there is still a need for electricity even when vehicles are stopped for a moment such as waiting for the red light. In other words, the conventional wind power generating device is not suitable for the condition in practice of the vehicle. Thereby, it is necessary to propose a wind power generating device suitable for the transportation vehicles.

SUMMARY OF THE INVENTION

Therefore, an objective of the present invention is to provide a wind power generating device installed in a vehicle capable of maintaining a time period of electricity generation even when wind speed is low or none due to vehicle stop In order to solve the abovementioned problem, the present invention provides a wind power generating device installed in a vehicle, comprising: a fan blade being rotated when receiving a wind force; a rotating device including a rotating disk, a plurality of magnetic elements, a plurality of ball chambers, and a plurality of balls, the rotating disk having a shaft connecting portion, the shaft connecting portion being coaxial with the rotating disk, the rotating disk kinetically connected to the fan blade through the shaft connecting portion to enable the rotating disk to rotate with the fan blade coaxially, the plurality of magnetic elements being annularly arranged at a periphery area of the rotating disk respectively, each magnetic element being allocated in a magnetic moment direction that shifts with a deviating angle from a radial direction of the rotating disk, the plurality of ball chambers being annularly arranged by surrounding the shaft connecting portion, each ball chamber extending outward from an outer wall of the shaft connecting portion, each ball chamber being formed with two side walls, each side wall being allocated as being shifted with a wall shifting angle from the radial direction of the rotating disk, and each ball chamber being provided with at least one ball; a securing ring neighbored and surrounding the rotating disk, the securing ring including a plurality of corresponding magnetic elements, each corresponding magnetic element being configured as annularly arranging in inner peripheral of the securing ring and facing the rotating disk in such a manner that the corresponding magnetic element is with magnetic repulsion to the magnetic element such that a magnetic repelling force between the magnetic elements and the corresponding magnetic elements is generated; and a power generating device having a power input shaft, the power input shaft being kinetically connected to the shaft connecting portion so as to rotate with the rotating disk.

In one embodiment of the present invention, each ball chamber is provided with one ball.

In one embodiment of the present invention, the deviating angle is 45 degree.

In one embodiment of the present invention, the wall shifting angle is 45 degree.

In one embodiment of the present invention, each magnetic element and each corresponding magnetic element face each other with the same magnetic polarity.

In one embodiment of the present invention, the fan blade includes a center shaft and a plurality of blades. The center shaft includes a shaft body and a cone portion projecting forward and tapering from the shaft body. The plurality of blades are allocated as surrounding the shaft body, and an apex angle of the cone portion is less than 30 degree.

In one embodiment of the present invention, each blade includes a front edge, a rear edge and an inner edge. The inner edge is connected between the front edge and the rear edge. A front end of the inner edge is connected to a front portion of the shaft body while a rear end of the inner edge is connected to the rear portion of the shaft body. A middle end is a middle portion of the inner edge located between the front end and the rear end. The middle end is in a U-shape and extends outward along the radial direction of the shaft body such that a wind-guiding hole is formed between the inner edge and the shaft body in such a manner that the blade is formed as a three-dimensional U-shape bending from front side to rear side.

In one embodiment of the present invention, each blade includes a front edge and a rear edge. Further, an outer edge portion of the front edge and an outer edge portion of the rear edge are in curve shape.

In one embodiment of the present invention, a curving degree of each curve-shaped rear edge is larger than a curving degree of each curve-shaped front edge.

By the technical means adopted by the wind power generating device of the present invention, the power generator is driven by a combination of the fan blade and the rotating disk providing with the magnets and the balls. When a vehicle is moving forward, the rotating disk is rotated by the driving force of the fan blade to enable the power generating device to generate electricity. A kinetic assisting device formed by a rotating device and a securing ring achieves an object of a smoother rotating movement for the power input shaft of the power generating device such that the wind power generating device is capable of maintaining a time period of electricity generation even when wind speed is low or none due to vehicle stop, and further enhances the practical requirement of wind power generating device as being installed in a vehicle.

DETAILED DESCRIPTION OF THE PREFERRED EMBODIMENTS

Figure 1:
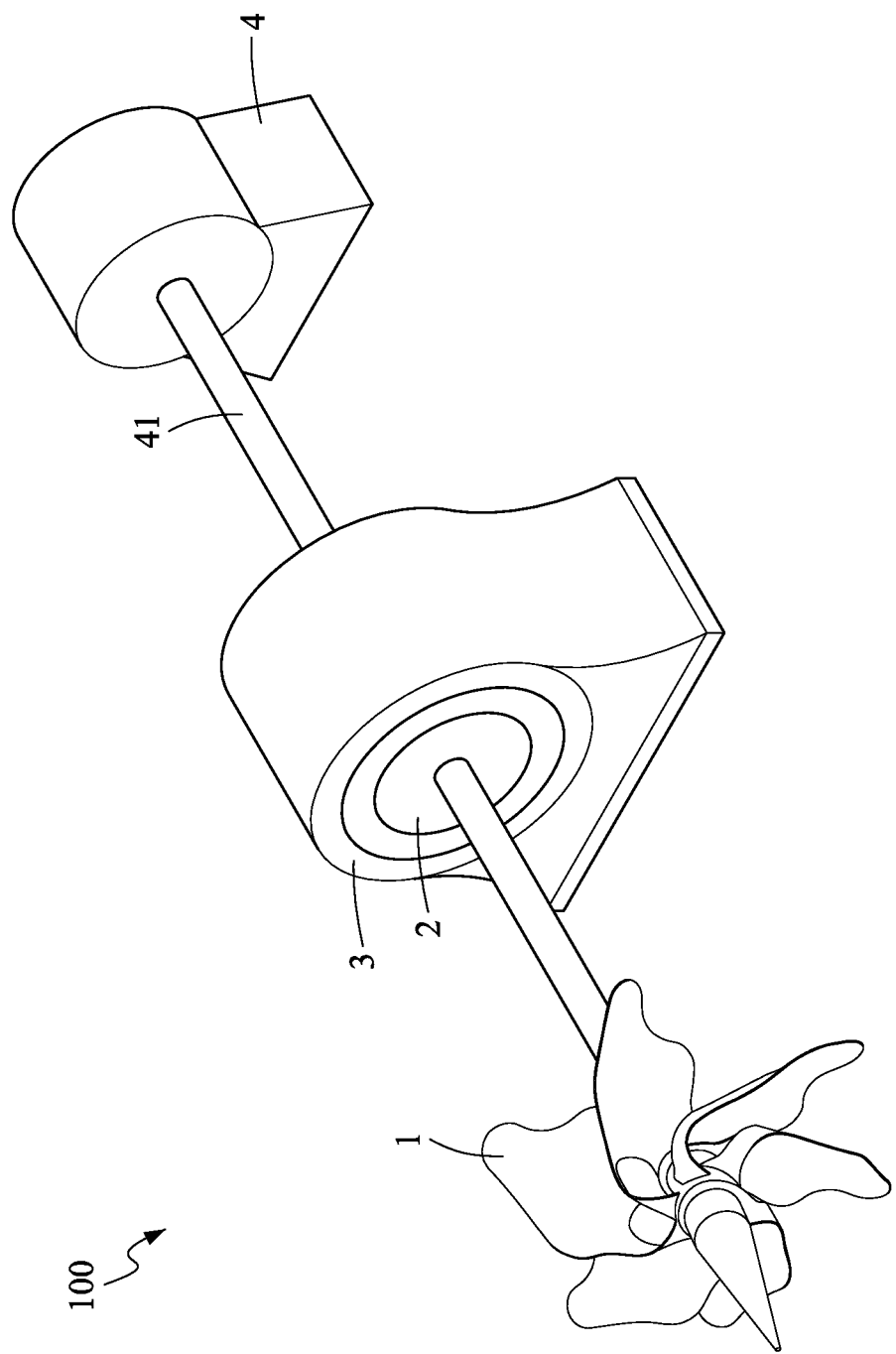
FIG. 1 is a perspective view illustrating a wind power generating device according to one embodiment of the present invention.

The preferred embodiments of the present invention are described in detail below with reference to FIG. 1 to FIG. 4. The description is used for explaining the embodiments of the present invention only, but not for limiting the scope of the claims.

As shown in FIG. 1 to FIG. 4, in one embodiment of the present invention, a wind power generating device 100, comprises: a fan blade 1 being rotated when receiving a wind force, a rotating device 2 including a rotating disk 20, a plurality of magnetic elements 21, a plurality of ball chambers 22 and a plurality of balls 23, the rotating disk 20 having a shaft connecting portion 201, the shaft connecting portion 201 being coaxial with the rotating disk 20, the rotating disk 20 kinetically connected to the fan blade 1 through the shaft connecting portion 201 to enable the rotating disk 20 to rotate with the fan blade 1 coaxially, the plurality of magnetic elements 21 being annularly arranged at a periphery area of the rotating disk 20 respectively, each magnetic element 21 being allocated in a magnetic moment direction that shifts with a deviating angle θ1 from a radial direction of the rotating disk 20, the plurality of ball chambers 22 being annularly arranged by surrounding the shaft connecting portion 201, each ball chamber 22 extending outward from an outer wall 202 of the shaft connecting portion 201, each ball chamber 22 being formed with two side walls 221, each side wall 221 being allocated as being shifted with a wall shifting angle θ2 from the radial direction of the rotating disk 20, and each ball chamber 22 being provided with at least one ball; a securing ring 3 neighbored and surrounding the rotating disk 20, the securing ring 3 including a plurality of corresponding magnetic elements 31, each corresponding magnetic element 31 being configured as annularly arranging in inner peripheral of the securing ring 3 and facing the rotating disk 20 in such a manner that the corresponding magnetic element 31 is with magnetic repulsion to the magnetic element 21 such that a magnetic repelling force between the magnetic elements 21 and the corresponding magnetic elements 31 is generated; and a power generating device 4 having a power input shaft 41, the power input shaft 41 being kinetically connected to the shaft connecting portion 201 so as to rotate with the rotating disk 20.

As shown in FIG. 1, the wind power generating device 100 according to the embodiment of the present invention is configured to enable the fan blade 1, the rotating device 2, and the power input shaft 41 of the power generating device 4 to share a common transmission shaft for rotation. In other embodiments, a transmission element, such as a reduction drive or a coupling, is used to transfer kinetic energy between the fan blade 1 and the shaft connecting portion 201, and/or between the shaft connecting portion 201 and the power input shaft 41 of the power generating device 4.

Figure 2:
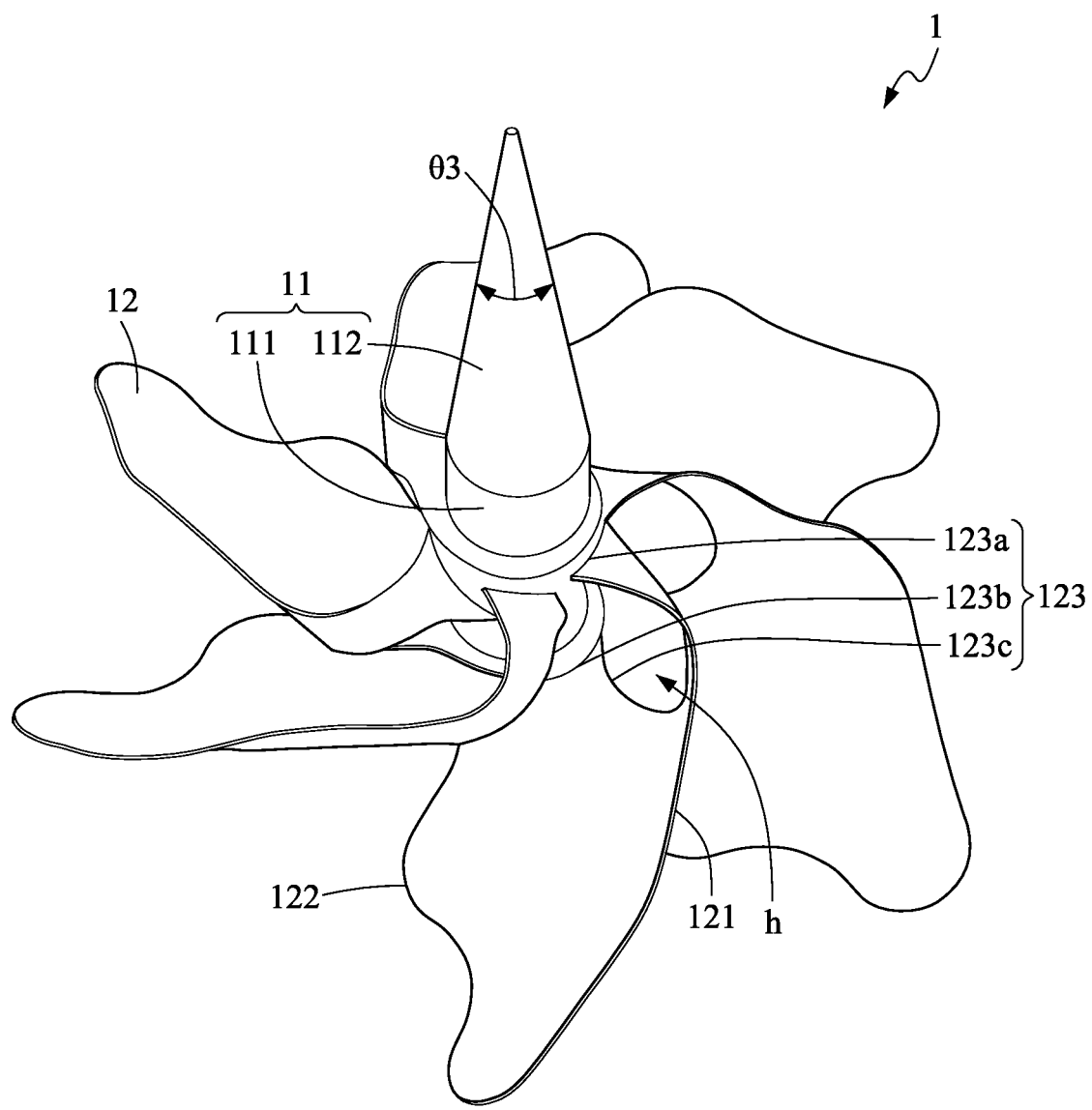
FIG. 2 is a perspective view illustrating a fan blade of the wind power generating device according to the embodiment of the present invention.

As shown in FIG. 2, in one embodiment of the present invention, the wind power generating device 100 is provided with the fan blade 1 including a center shaft 11 and a plurality of blades 12. The center shaft 11 includes a shaft body 111 and a cone portion 112 projecting forward and tapering from the shaft body 111. The plurality of blades 12 is allocated around the shaft body 111. An apex angle θ3 of the cone portion 112 is less than 30 degrees. By means of the low resistance provided by streamlined outline of the cone portion 112, kinetic energy of the wind can be better transferred to the blades 12 to reduce energy loss.

Figure 3:
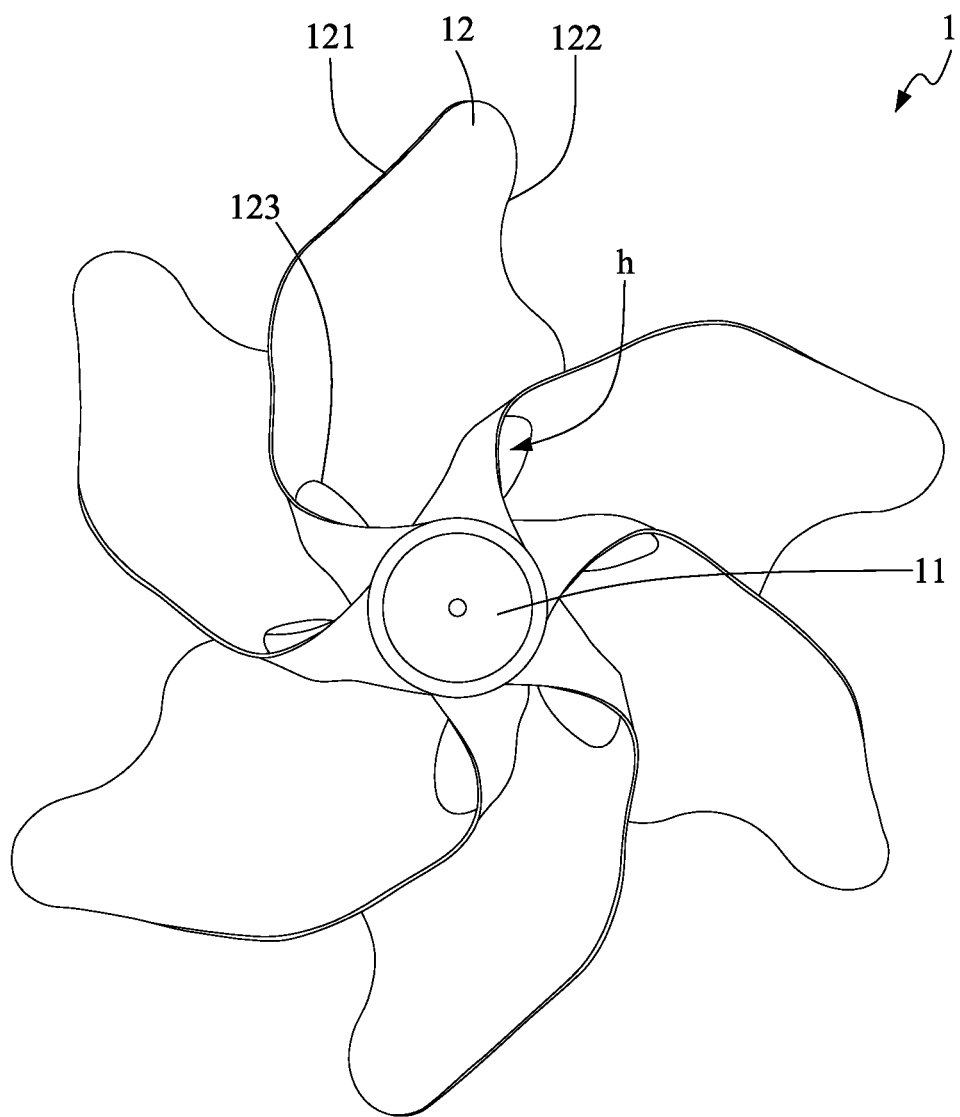
FIG. 3 is a top view illustrating a fan blade of the wind power generating device according to the embodiment of the present invention.

As shown in FIG. 2 and FIG. 3, each blade 12 includes a front edge 121, a rear edge 122 and an inner edge 123. The inner edge 123 is connected between the front edge 121 and the rear edge 122. An outer edge portion of the front edge 121 and an outer edge portion of the rear edge 122 are in curve shape. Further, a curving degree of each rear edge 122 is larger than a curving degree of each front edge 121. A front end 123a of the inner edge 123 is connected to the front portion of the shaft body 111 while a rear end 123b of the inner edge 123 is connected to the rear portion of the shaft body 111. A middle end 123c is a middle portion of the inner edge 123 located between the front end 123a and the rear end 123b. The middle end 123c is in a U-shape and extends outward along the radial direction of the shaft body 111 such that a wind-guiding hole h is formed between the inner edge 123 and the shaft body 111 in such a manner that the blade 12 is formed as a three-dimensional U-shape bending from front side to rear side. A three-dimensional configuration of the wind-guiding hole h and the blade 12 enables the fan blade 1 to have good wind load capacity.

The periphery of the rotating disk 20 is provided with a plurality of slots, each slot being arranged in equidistance to accommodate the magnetic elements 21. The inner edge of the securing ring 3 is also provided with a plurality of slots arranged in equidistance to accommodate the corresponding magnetic elements 31. The magnetic elements 21 and the corresponding magnetic elements 31 are permanent magnets. Each magnetic element 21 is allocated in a magnetic moment direction that shifts in the same clockwise or same counterclockwise direction with a deviating angle θ1 from a radial direction of the rotating disk 2. In the present embodiment, the deviating angle θ1 is 45 degrees. Of course, the deviating angle θ1 may also be other non-zero and non-vertical degree.

Figure 4:
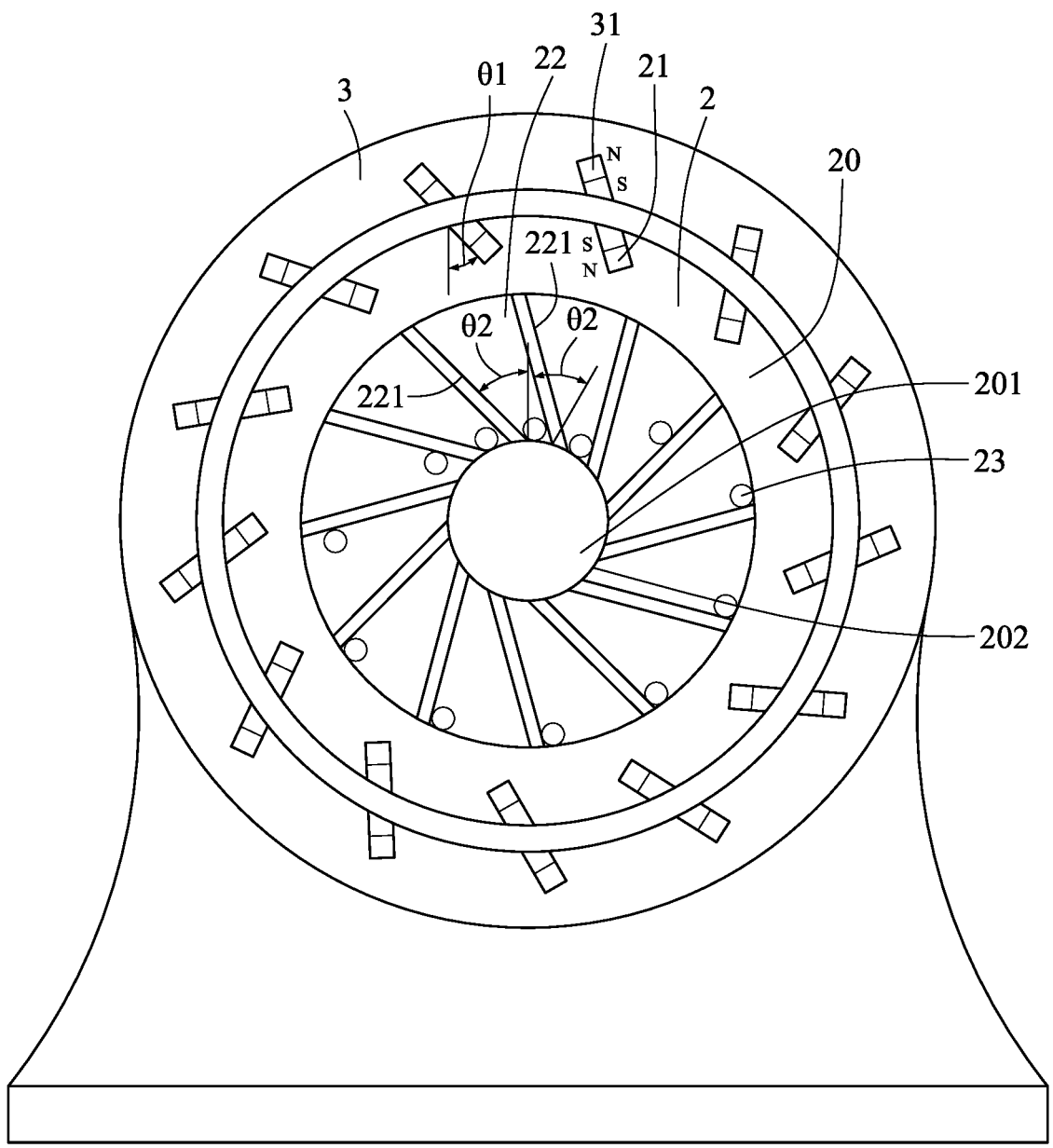
FIG. 4 is a side view illustrating a rotating disk and a securing ring of the wind power generating device according to the embodiment of the present invention.

As shown in FIG. 4, in the present embodiment, each magnetic element 21 is allocated in the magnetic moment direction parallel to the longitudinal direction of each magnetic element 21. Further, an outward side of each magnetic element 21 is a south pole. Each corresponding magnetic element 31 is allocated in the magnetic moment direction parallel to the longitudinal direction of each corresponding magnetic element 31. Further, an inward side of each corresponding magnetic moment 31 is a south pole. Accordingly, each magnetic element 21 and each corresponding magnetic element 31 face each other with the same polarity. A magnetic force induced between each magnetic component 21 and each corresponding magnetic component 31 generates a torque. In other embodiments, each magnetic element 21 and each corresponding magnetic element 31 face each other with the opposite ones of polarity such that the magnetic force induced between each magnetic element 21 and each corresponding magnetic element 31 generates a reverse torque.

As shown in FIG. 4, the side wall 221 of each ball chamber 22 is a flat plane that shifts in the same clockwise or same counterclockwise direction with a wall shifting angle θ2 from a radial direction of the rotating disk 20. In the present embodiment, the wall shifting angle θ2 is 45 degrees. Of course, the wall shifting angle θ2 may also be other non-zero and non-vertical degree.

In the present embodiment, each ball chamber 22 is provided with one round ball 23. When the rotating disk 20 is rotating, a recurring displacement of each ball 23 in the ball chamber 22 generates a varying torque time to time.

As shown in FIG. 1, the power generating device 4 is a single device that operates independently and drives coils of the power generating device 4 to generate electricity through the rotation of the power input shaft 41. In other embodiments, the power generating device 4 may also be a set of power generators containing a plurality of generators that are used in parallel.

With the abovementioned structure, the kinetic assisting device formed by the rotating disk 2 and the securing ring 3 achieves an object of a smoother rotating movement for the power input shaft 41 of the power generating device 4 such that the wind power generating device 100 is capable of maintaining a time period of electricity generation even when wind speed is low or none due to vehicle stop, and further enhances the practical requirement of wind power generating device as being installed in a vehicle.

The above description should be considered only as an explanation of the preferred embodiment of the present invention. A person with ordinary skill in the art can make various modifications to the present invention based on the scope of the claims and the above description. However, those modifications shall fall within the scope of the present invention.

What is claimed is:

1. A wind power generating device installed in a vehicle, comprising:
    a fan blade being rotated when receiving a wind force;
    a rotating device including a rotating disk, a plurality of magnetic elements, a plurality of ball chambers and a plurality of balls, the rotating disk having a shaft connecting portion, the shaft connecting portion being coaxial with the rotating disk, the rotating disk kinetically connected to the fan blade through the shaft connecting portion to enable the rotating disk to rotate with the fan blade coaxially, the plurality of magnetic elements being annularly arranged at a periphery area of the rotating disk respectively, each magnetic element being allocated in a magnetic moment direction that shifts with a deviating angle from a radial direction of the rotating disk, the plurality of ball chambers being annularly arranged by surrounding the shaft connecting portion, each ball chamber extending outward from an outer wall of the shaft connecting portion, each ball chamber being formed with two side walls, each side wall being allocated as being shifted with a wall shifting angle from the radial direction of the rotating disk, and each ball chamber being provided with at least one ball;
    a securing ring neighbored and surrounding the rotating disk, the securing ring including a plurality of corresponding magnetic elements, each corresponding magnetic element being configured as annularly arranging in inner peripheral of the securing ring and facing the rotating disk in such a manner that the corresponding magnetic element is with magnetic repulsion to the magnetic element such that a magnetic repelling force between the magnetic elements and the corresponding magnetic elements is generated; and
    a power generating device having a power input shaft, the power input shaft being kinetically connected to the shaft connecting portion so as to rotate with the rotating disk.

2. A wind power generating device according to claim 1, wherein each ball chamber is provided with one ball.

3. A wind power generating device according to claim 1, wherein the deviating angle of the magnetic elements is 45 degrees.

4. A wind power generating device according to claim 1, wherein the wall shifting angle of the side wall of the ball chamber is 45 degrees.

5. A wind power generating device according to claim 1, wherein each magnetic element and each corresponding magnetic element face each other with the same magnetic polarity.

6. A wind power generating device according to claim 1, wherein the fan blade includes a center shaft and a plurality of blades, the center shaft including a shaft body and a cone portion, the cone portion projecting forward and tapering from the shaft body, the plurality of blades being allocated as surrounding the shaft body, and an apex angle of the cone portion being less than 30 degrees.

7. A wind power generating device according to claim 6, wherein each blade includes a front edge, a rear edge and an inner edge, the inner edge being connected between the front edge and the rear edge, a front end of the inner edge being connected to a front portion of the shaft body while a rear end of the inner edge being connected to a rear portion of the shaft body, a middle end being a middle portion of the inner edge located between the front end and the rear end, the middle end being in a U-shape and extended outward along the radial direction of the shaft body such that a wind-guiding hole is formed between the inner edge and the shaft body in such a manner that the blade is formed as a three-dimensional U-shape bending from front side to rear side.

8. A wind power generating device according to claim 6, wherein each blade includes a front edge and a rear edge, an outer edge portion of the front edge and an outer edge portion of the rear edge being in curve shape.

9. A wind power generating device according to claim 8, wherein a curving degree of each curve-shaped rear edge is large than a curving degree of each curve-shaped front edge.

* * * * *